United States Patent

Hildenbrand

[19]

[11] Patent Number: 6,070,621
[45] Date of Patent: Jun. 6, 2000

[54] DISPENSING METHOD AND SYSTEM

[76] Inventor: Ralf Hildenbrand, Wilhelm-Ostwald Strasse 8, 53721, Siegburg, Germany

[21] Appl. No.: 09/065,085
[22] PCT Filed: Oct. 29, 1996
[86] PCT No.: PCT/EP96/04690
§ 371 Date: Aug. 12, 1998
§ 102(e) Date: Aug. 12, 1998
[87] PCT Pub. No.: WO97/16241
PCT Pub. Date: May 9, 1997

[30] Foreign Application Priority Data

Oct. 30, 1995 [DE] Germany .................. 195 40 449

[51] Int. Cl.[7] ................................... B65B 1/30
[52] U.S. Cl. .................. 141/83; 141/2; 141/9; 141/100; 141/104; 141/129; 141/192; 141/250; 141/284; 198/347.1
[58] Field of Search .................. 141/2, 9, 83, 94, 141/129, 192, 231, 232, 234, 250, 284, 100, 104; 198/347.1, 347.2; 222/77, 160

[56] References Cited

U.S. PATENT DOCUMENTS 4,585,148 4/1986 Ito ............................................. 222/77
4,867,258 9/1989 Narukawa et al. ..................... 177/116

FOREIGN PATENT DOCUMENTS

| 0 056 170 A1 | 7/1982 | European Pat. Off. . |
| 0 351 681 A1 | 1/1990 | European Pat. Off. . |
| 0 391 286 A1 | 10/1990 | European Pat. Off. . |
| 0 427 497 A1 | 5/1991 | European Pat. Off. . |
| 0 461 371 A1 | 12/1991 | European Pat. Off. . |
| 34 30 170 A1 | 2/1986 | Germany . |
| 62277136 | 12/1987 | Japan . |
| 2 242 280 | 9/1991 | United Kingdom . |

*Primary Examiner*—Steven O. Douglas
*Assistant Examiner*—Timothy L. Maust
*Attorney, Agent, or Firm*—Harness, Dickey & Pierce, P.L.C.

[57] ABSTRACT

A method and apparatus for metering one or several constituents of flowable substances, especially of printing inks, has a store which contain a plurality of storage containers for different constituents. The storage containers each include outlet valves. At least one metering station is included to which the storage containers can be conveyed. An actuator is at the metering station to actuate the outlet valve. A conveyor is suitable to move the storage containers to the at least one metering station. It is proposed that the store is formed by a storage system for storing the storage containers. The conveyor is designed to take from and return to the storage system individual storage containers independently of one another. The conveyor has at least one track loop to which the at least one metering station is connected.

23 Claims, 2 Drawing Sheets

DISPENSING METHOD AND SYSTEM

BACKGROUND OF THE INVENTION

The invention relates to a method and apparatus for dispensing or metering one or several constituents of flowable substances, especially of printing inks. Storage means contain a plurality of storage containers for different constituents. The storage containers each comprise outlet valve means. At least one metering station is included. The metering station receives the storage containers conveyed to it. Actuating means at the metering station actuates the outlet valve means. A conveying means conveys the storage containers to the at least one metering station.

A metering apparatus is shown in EP 0 391 286 A1. Here, a plurality of canisters are arranged on a rotary table. In order to meter and add individual constituents to a mixed product, the table is moved into a respective position where an individual canister is rotated into a dispensing and metering station. The actuating means in the metering station act on the canister so that a defined quantity of the constituent in the station, is introduced into a mixing or collecting container. Each of the canisters inserted into the rotary table is provided with integrated outlet valve means which can be controlled by actuating means associated with the metering station. In an apparatus of this type, the number of canisters for individual constituents is limited by an acceptable size of the rotary table with a given size of the individual canisters.

The canisters each comprise an outlet valve which, in the position as inserted into the rotary table, points downwards. In particular, the outlet valve means are in the form of a ball cock. At their open end opposite the outlet valve means, the canisters each have a displacement piston which is loaded and displaced by setting means in the metering station while the outlet valve is opened. Underneath the displacement piston, an air cushion is present to prevent direct contact of the flowable medium, e.g. especially printing ink, with the displacement piston.

In the rotary table, within the canister receiving means which are positioned on one diameter designed for being introduced into the metering station, a second canister receiving ring is provided on a second inner diameter to insert reserve canisters in a reversed position in which they cannot be actuated. This measure simplifies the operation of manually exchanging emptied canisters against reserve canisters.

To increase the number of addable constituents as a function of the number of canisters in the rotary table, a storage bin is provided. The storage bin is not functionally connected to the rotary table. Canisters can be manually inserted into the receiving means of the rotary table. However, the canisters have to be exchanged against canisters being present in the receiving means.

The control process is based on certain individual canisters associated with certain receiving positions in the rotary table. This is due to a home position orientating itself entirely on the position of the rotary table. A flag for a zero position is arranged directly at the rotary table. Further flags are arranged at the rotary table to measure the travel to the individual canisters.

The apparatus of the above type is thus designed for a limited number of constituents and for small quantities of constituents to be mixed.

An apparatus of a similar type is illustrated in EP 0 461 371 B1. Here, a plurality of storage containers each contain one dye substance. The containers are arranged in a predetermined number so as to be firmly associated with one another. The containers are on a rotary plate or on a slide which is movable in two directions. The storage containers are spray bottles with a sleeve containing the dye and with a gas bubble thereabove. The gas bubble may be under a pre-pressure, but the pre-pressure may also be generated entirely by the elasticity of the elastic sleeve. Pressure compensation takes place between the air bubble thereabove and the environment. Each of the storage containers is provided with integrated outlet valve means. In a metering station into which one of the storage containers is guided, the outlet valve means are opened by setting means. A collecting container inserted into the metering station loads a weighing device which controls the setting means for the outlet valve means.

In the case of this apparatus, the storage containers include a code containing information on the contents of the respective storage container. The code is scanned mechanically. To increase the number of the individual storage containers, two concentric circles of receiving means are provided in a rotary plate. Also, to increase the number of storage containers, individual discs are allowed to rotate within a rotary plate. The discs each have a plurality of receiving means for storage containers. Nevertheless, the total number of storage containers is limited by the size of the rotary plate or by the size of the slide. In addition, because of the design of the storage containers, their size can be assumed to be relatively small. The purpose of this apparatus is to produce mixtures of hair dyes.

U.S. Pat. No. 4,867,258 discloses an apparatus to produce mixtures of pourable powdery or granular substances. Here, a plurality of mixing containers is arranged together in a magazine. The mixing containers can be transported individually to a metering station. A plurality of powder storage containers is arranged in a different magazine. The powder storage containers, for the purpose of adding a constituent, are also transported individually to a metering station. The transport means includes one single linear conveying slide and a transversely movable magazine for the individual storage containers. Each storage container is moved in this linear way into the metering station. Each container has to be returned from there into its position in the magazine before the magazine moves and before the next storage container is transported by the same means and in the same way into the metering station and returned from there. The magazine contains only a small number of storage containers.

The above assemblies are not suitable for metering printing inks in ink factories or printing works. In such applications, the number of constituents required and the absolute quantity of inks is so large that a total supply of several tons in weight always has to be available. The consumption of the individual constituents varies, so that it must be possible to exchange, or add to, individual storage containers in a problem-free way without interrupting the operation of the at least one metering station. This objective cannot be achieved with devices with rotary plates or slides whose purpose it is to allow the use of the complete number of constituents dispensed under undisturbed and uninterrupted operational conditions. Therefore, for such applications, it has so far been common practice to use systems with fixedly installed storage containers and with fixed pipelines leading from each individual storage container to a metering station. Each of the individual pipelines has its own pumping means and its own valve means which are freely controllable. The amount of equipment required is considerable and involves high purchase and maintenance costs. The individual pipelines contain large quantities of ink which constitute a non-usable dead volume. Inside the pipelines, the ink is subject to early ageing. Exchanging inks involves high losses and considerable cleaning efforts.

SUMMARY OF THE INVENTION

It is therefore an object of the present invention to provide a method and apparatus of the initially mentioned type which, while requiring less equipment, permit large quantities of constituents to be available simultaneously as well as uninterrupted and undisturbed operation.

The objective is achieved by providing a method where individual storage containers, after having been independently taken from the storage means, are conveyed to the metering station. The storage containers are also returned into the storage means. In the process, the storage containers pass through at least one loop-shaped path.

Furthermore, the objective is achieved by providing an apparatus where the storage means are formed by a storage bin for storing the storage containers. A conveying means is designed for taking and returning individual storage containers independently of one another to the storage bin. The conveying means includes at least one track loop to which the at least one metering station is connected.

The inventive method ensures that out of a large number of available storage containers only a certain number of storage containers required for a certain metering operation are conveyed to the metering station. By conveying the storage containers along a loop-shaped path, it becomes possible to simultaneously carry out feeding, metering and returning phases of the various storage containers required for a particular metering operation.

This means that the apparatus in accordance with the invention has a storage bin whose size is not firmly predetermined and, if necessary, can be enlarged. The storage bin has a relatively simple conveying means whose configuration is firmly predetermined. The conveying means serves to transport and handle the storage containers. Also, at least one metering station is included. The individual storage containers can be introduced into the track loop at short intervals without having to wait until the previously introduced storage container has been returned into the storage bin.

The storage containers are provided with codes. Thus, the storage bin can be organized chaotically, with each returning storage container moved to the nearest position which has just been released by a further storage container moved into the track loop. The storage bin can be provided in the form of a double- or multi-shelf storage bin.

A major advantage of the inventive apparatus as compared to apparatus previously used in the preferred field of application, is that there is no longer any need for expensive and maintenance-intensive pumps and individual pipelines. Such equipment is replaced by technically much simpler conveying means for the storage containers. The energy consumption involved in transporting the ink is greatly reduced, especially in the case of pasty inks, because high pressure losses which had to be overcome in the individual pipelines are no longer present. The cleaning costs are much lower because as compared to pipelines and pumps, the storage containers are much easier to clean.

In the case of constituents which are more frequently required or have to be added in larger quantities, it is advantageous to provide several standard storage containers so that the constituents are readily available in the magazine.

A data recording and data processing system for controlling the apparatus comprises a store administering unit for the storage containers contained in the store and their up-to-date contents; a transport control unit for controlling the conveying means; a metering control unit for the metering station; with the quantities dispensed in the metering unit being recorded and registered in the store administering unit. The data processing system furthermore comprises a formulation administering unit where a plurality of formulations is stored. In addition, an interactive command administering unit is provided for feeding in and confirming commands for carrying out metering operations.

The conveying means, especially in the region of the track loop itself, may be driven roller tracks. The conveying means may be suspended tracks or ground level conveying means of the conventional type. In the region where the store is connected to the track loop, it is also possible to provide a semi-automatic operative-controlled conveying means. It is possible to effect a semi-automatic transfer via a stacking vehicle. The control commands for the vehicle operative originate from the central control system. The central control system has to indicate to the operative which storage containers are to be transferred to the conveying system and in what sequence and/or in which advantageous positions in the store system it has to deposit returning storage containers. However, it is also possible to provide only firmly installed conveying means for the storage containers between the storage bin and the metering station. Empty storage containers can be moved into a certain replacement area in the storage bin.

The expression "track loop" refers to any track system which, between the storage bin and the metering station, has at least one feeder line and one return line. The track loop can be an open U-shaped loop which is connected directly to distributor means inside the storage bin, or a closed loop which, via a short single-track connection, is connected to distributor means inside the storage bin. Within the track loop, transport is preferably effected entirely by unidirectional (one-way-traffic) conveyance.

Several metering stations may be arranged within the track-loop. This is particularly advantageous in those cases where simultaneously identical quantities have to be metered for several consumers or where simultaneously different quantities have to be metered by using the same constituents or at least predominantly the same constituents. If one constituent is not required in one metering operation, it can be moved through the respective metering station or it can be controlled in such a way that it bypasses the metering station through a bypass. In such a case, the track loop itself can be provided in the form of a buffer for intermediate storage purpose, or a buffer line can be provided in the form of a parallel line.

To improve the flexibility of the conveying means it is possible, especially in the vicinity of the metering station, to connect the feeder line and the returning line by means of a short-circuit line.

The storage containers can be simple transport containers of a cylindrical or cubic shape. Ordinarily, a discharge opening with a plug is firmly inserted into the storage container base. At the opposed upper cover opening, a transport cover can be provided. When the storage container is in use, the transport cover can be removed, with a sealing displacer plate inserted into the cover opening. At the same time, the plug is removed and replaced by a valve in the base. The displacer plate can be loaded by a setting piston in the metering station for the purpose of ejecting ink out of the valve. The valve is opened simultaneously to enable ejection of the ink.

According to a further embodiment, it is possible to provide a storage container with a firmly closed cover. The cover has a threaded opening for a connecting valve for a compressed gas connection. In such a case, the liquid can be ejected in the metering station entirely by applying compressed gas. As already described above, the valve in the discharge opening has to be opened at the same time. In such an application, the compressed gas should be inert gas.

According to a further embodiment of the storage containers, the simple transport container is provided with a closed base. After a transport cover has been removed, a displacer plate is inserted into the cover opening of the transport container. The displacer plate has a riser pipe with a valve slidingly guided therein. This is particularly advantageous for low-viscosity inks. When moving forward the displacer plate, the valve means must be opened at the same time.

From the following detailed description, taken in conjunction with the drawings and subjoined claims, other objects and advantages of the present invention will become apparent to those skilled in the art.

BRIEF DESCRIPTION OF THE DRAWINGS

Preferred embodiments of the invention are described with reference to the drawings wherein.

DETAILED DESCRIPTION OF THE PREFERRED EMBODIMENT

Figure 1:
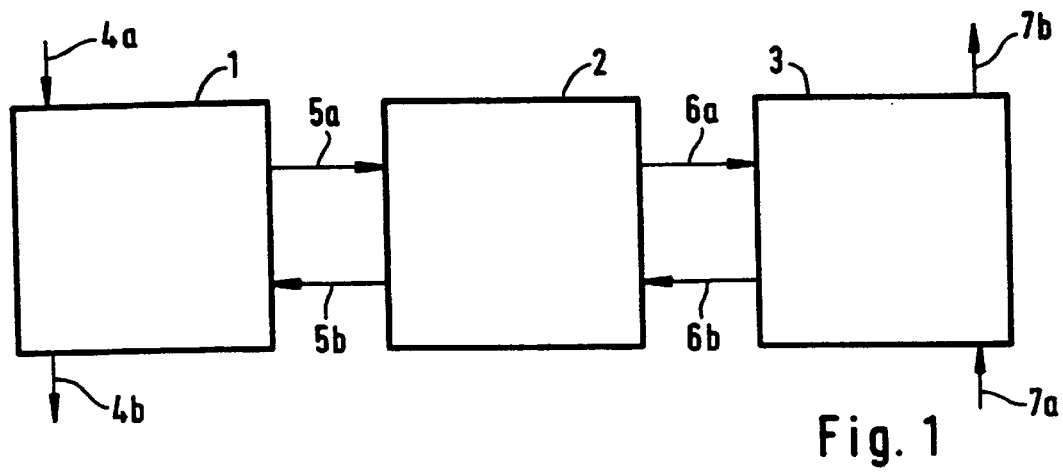
FIG. 1 is a block diagram of the components of the present invention.

FIG. 1 shows the three basic units of the inventive apparatus connected to one another. A chaotically or randomly organized storage system 1 is coupled with a conveying system 2, with intelligent control means for the dispensing, and a metering system 3. As illustrated at the storage system 1, by incoming and outgoing arrows 4a, 4b, the storage system has an outwardly directed interface to remove empty storage containers and to feed filled storage containers into the storage system.

The connection between the storage system 1 and the conveying system 2 is indicated by two arrows 5a, 5b which extend in opposite directions. The connection is preferably effected at separate input and output points which, however, may also be identical.

The connection allowing the transfer and return of storage containers from the conveying system 2 into and out of the dispensing and metering system 3 are indicated by arrows 6a, 6b. Depending on how the dispensing and metering system 3 is integrated into the conveying system 2, this area may be provided with separate input and output points which, however, may also be identical.

The reference numbers 7a and 7b have been given to incoming and outgoing arrows for feeding metering containers into the dispensing and metering system and for returning same.

Figure 2:
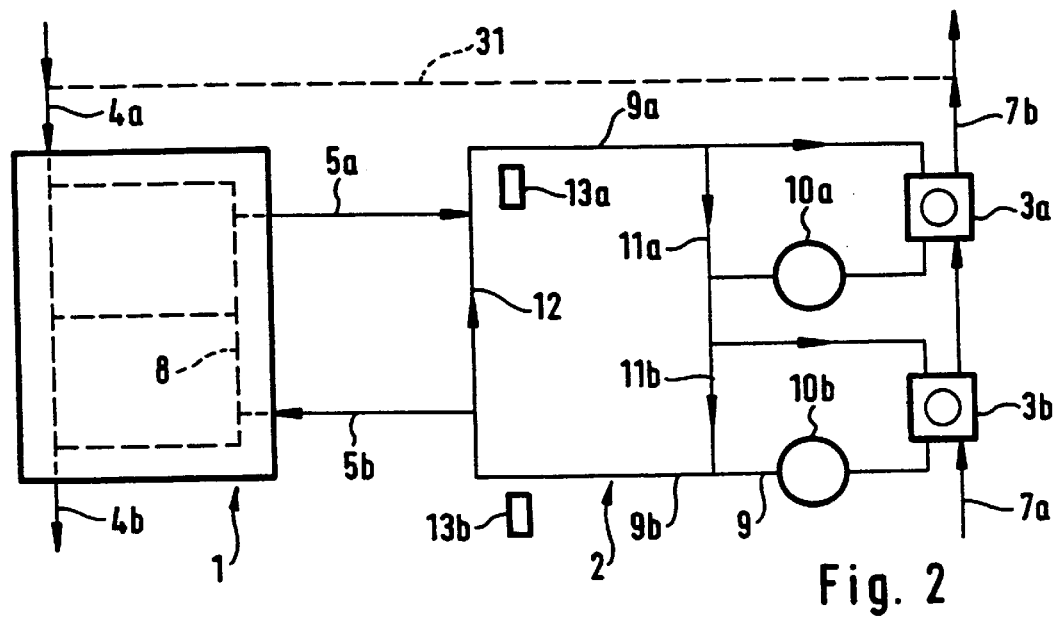
FIG. 2 is a schematic plan view of the inventive apparatus showing the principle of the lay-out.

FIG. 2 is a plan view of the storage bin 1 wherein dashed lines indicate individual distributor tracks 8 inside the storage bin. The feeder and return tracks 5a, 5b start from the storage bin 1 and connect with the conveying system 2. In this embodiment, the tracks 5a, 5b are indicated by arrows and constitute one-way tracks. Furthermore, the conveying system has a track loop 9 which is used as a one-way track and is passed through clockwise.

Two metering stations 3a, 3b and two cleaning stations 10a, 10b are incorporated into the track loop 9. The track lines 11a, 11b constitute a bypass line each relative to the metering stations 3a, 3b. The feeder and return lines 9a, 9b of the track loop 9 are connected by a track line 12 which serves as a short-circuit line. A first detection member 13a, which includes code readers, detects the storage containers immediately after they have been guided into the track loop. A second detection member 13b, with a second code reader, detects the storage container immediately prior to leaving the track loop. The code readers may read barcodes, microchips or the like.

The reference numbers 7a and 7b indicate the travel of dispensing and metering containers through the metering stations 3a, 3b. A connecting track 31 indicated by dashed lines shows that individual mixtures of special inks can be guided into the store. If refilling is to be avoided, storage containers have to be moved into the metering station for this purpose.

Figure 3A:
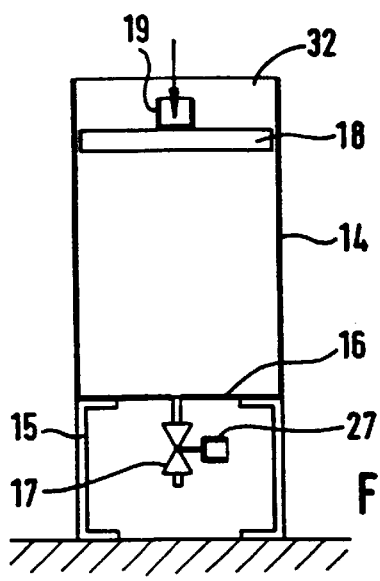
FIG. 3a shows a storage container in a first embodiment.

FIG. 3a shows a storage container 14 in a first embodiment which comprises feet 15 and, in its base 16, is provided with symbolically illustrated outlet valve means 17. The upper opening 32 is closed by a displacer plate 18 which is provided with an adapter or with a coupling piece 19 for introducing a feed piston rod.

Figure 3B:
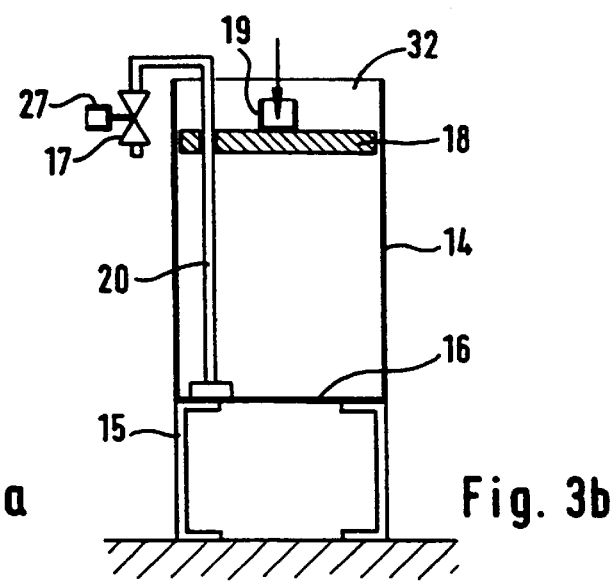
FIG. 3b shows a storage container in a second embodiment.

FIG. 3b shows a storage container 14 in a second embodiment which has feet 15 and a closed base 16. Into the upper opening 32, a displacer plate 18 is inserted with a coupling or adapter piece 19 to receive a feed piston rod. An immersion tube 20 passes through, and is slidingly guided in, the displacer plate 18. The tube 20 extends deep into the container 14, with outlet valve means 17 arranged at the outlet end. The valve means 17 each include adapter pieces 27 which engage the respective setting means in the metering station.

Figure 4A:
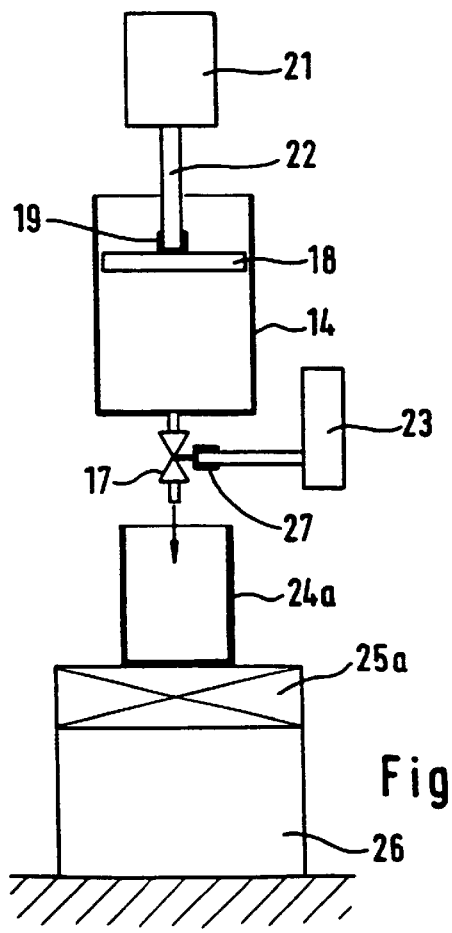
FIG. 4a shows a metering station in a first embodiment.
Figure 4B:
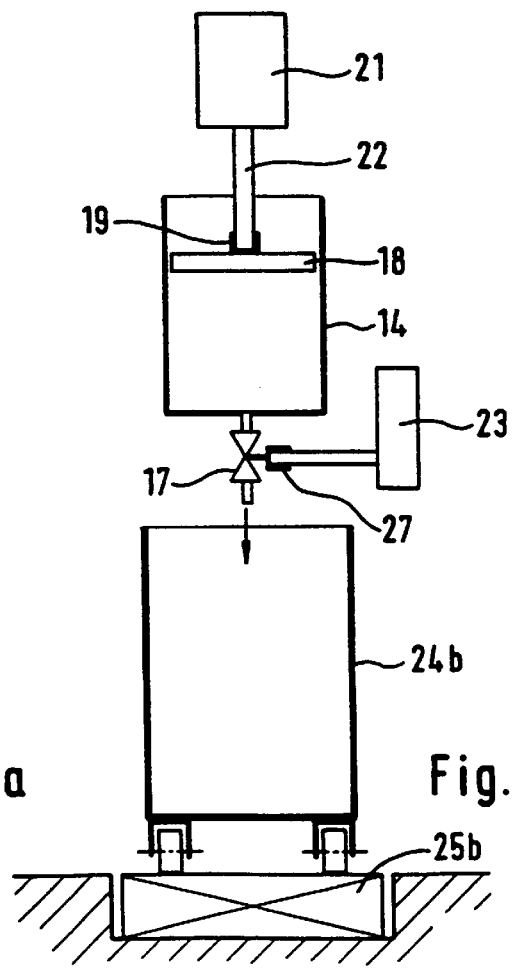
FIG. 4b shows a metering station in a second embodiment.

FIGS. 4a, 4b each show a metering station. A storage container 14, whose details correspond to those shown in FIG. 3, are incorporated into said metering station. In each Figure, a displacer unit 21 is shown with a feed piston rod 22 which can be coupled with the coupling piece 19. A setting unit 23 is also shown. The setting unit may actuate the valve means as a function of weight or as a function of time. The setting unit includes engaging means for the adapter piece 27 of the outlet valve means 17. Underneath each outlet valve 17, a metering or collecting container 24a, 24b is positioned on a weighing device 25a, 25b. FIG. 4a shows the weighing device 25a on a pedestal 26. FIG. 4b shows the weighing device 25b inserted into the base, with the container being movable.

Figure 5:
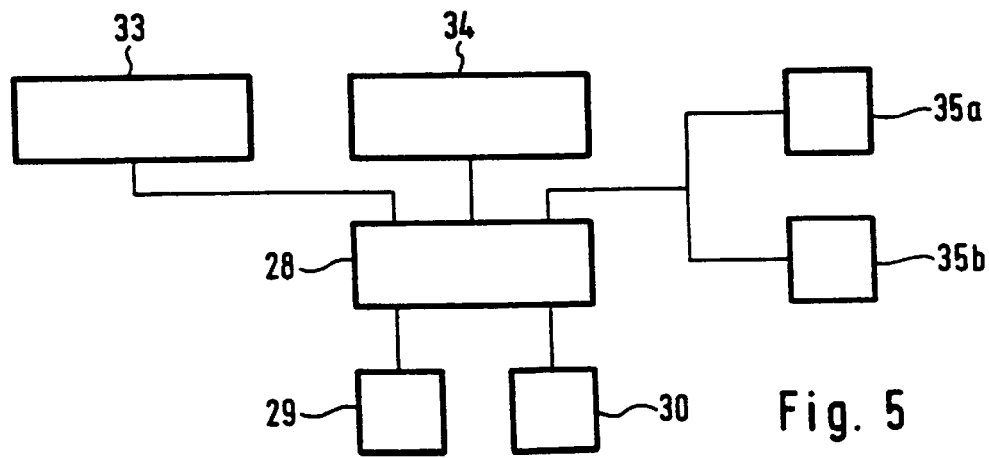
FIG. 5 shows a control diagram for electrically controlling the entire system.

FIG. 5 contains a symbolic illustration of the data processing and control system. A central position is occupied by a Server-PC 28 which is connected to a store administering system 33, a conveyance control system 34, and to a double metering control system 35a, 35b. The Server-PC 28 is also coupled with a command administering unit 29 and a formulation administering unit 30.

While the above detailed description describes the preferred embodiment of the present invention, the invention is susceptible to modification, variation and alteration without deviating from the scope and fair meaning of the subjoined claims.

What is claimed is:

1. An apparatus for metering one or several constituents of flowable substances, especially of printing inks, comprising:
    storage means containing a plurality of storage containers for different constituents, said storage containers each having outlet valve means;
    at least one metering station to which the storage containers can be conveyed;
    actuating means at the metering station, said actuating means for actuating the outlet valve means;
    conveying means for conveying said storage containers to the at least one metering station; and
    said storage means being formed by a store for storing said storage containers, said conveying means taking from and returning said individual storage containers to the store independently of one another, and said conveying means comprise at least one track loop to which the at least one metering station is connected.

2. An apparatus according to claim 1, wherein said store is a chaotically organized store with changing positioning places for individual storage containers.

3. An apparatus according to claim 1, wherein said conveying means comprise roller tracks, suspended tracks, ground level conveying means, especially in the region of the track loop.

4. An apparatus according to claim 1, wherein several metering stations are arranged within the track loop.

5. An apparatus according to claim 1, wherein a bypass track is provided to extend parallel to each metering station.

6. An apparatus according to claim 1, wherein at least one short-circuit track is incorporated into the track loop between a return line and a feeder line.

7. An apparatus according to claim 1, wherein a connection between the store and the at least one track loop comprises a feeder and a return line.

8. An apparatus according to claim 1, wherein a weighing device in the metering station records the weight of a metering or collecting container positioned underneath the outlet valve means.

9. An apparatus according to claim 1, wherein a connecting track is provided for moving metering or collecting containers into the store.

10. An apparatus according to claim 1, wherein a computer for central control purposes, having means for administering the occupation of the store and the contents of containers, means for administering formulations and commands, means for controlling the conveying means for the storage containers and means for controlling the actuating means for the outlet valve means controls the apparatus.

11. An apparatus according to claim 1, wherein said at least one metering station is incorporated into the track loop by feeder and return lines.

12. An apparatus according to claim 11, wherein said feeder and return lines for the metering station are unified to form a terminal line which is connectable to the track loop.

13. An apparatus according to claim 1, wherein said at least one buffer loop is provided to permit intermediate storage of several storage containers.

14. An apparatus according to claim 13, wherein said track loop and the buffer loops are provided in the form of one way tracks.

15. An apparatus according to claim 1, wherein said storage containers each comprise a displacer plate which is inserted into a cover opening.

16. An apparatus according to claim 15, wherein said metering station comprises a feeding element which acts on the displacer plate of a storage container.

17. An apparatus according to claim 1, wherein the metering station comprises a valve control element which acts on the outlet valve means of a storage container.

18. An apparatus according to claim 17, wherein the metering station comprises a weighing device and the valve control element actuates the outlet valve means as a function of weight.

19. An apparatus according to claim 17, wherein the valve control element actuates the outlet valve means as a function of time.

20. An apparatus according to claim 1, wherein said storage containers carry codes and that the conveying means are provided with detecting means for the codes.

21. An apparatus according to claim 20, wherein the codes are of a visual kind, such as barcodes.

22. An apparatus according to claim 20, wherein the codes are in the form of microchips.

23. A method of metering one or several constituents of flowable substances, especially of printing inks, by means of an apparatus comprising storage means containing a plurality of storage containers for different constituents, said storage containers each having an outlet valve means, at least one metering station to which the storage containers can be conveyed, actuating means at the metering station, said actuating means are suitable for actuating the outlet valve means, and conveying means for conveying said storage containers to the at least one metering station, said method comprising:
    taking individual storage containers independently from said storage means;
    conveying said individual storage containers to the metering station;
    returning said individual storage containers to the storage means; and
    passing said individual storage containers through at least one loop-shaped path as the individual storage containers move between said storage means and said metering station.

* * * * *